United States Patent [19]

Koob

[11] 4,386,717

[45] Jun. 7, 1983

[54] DISPENSER HAVING HOSE-LIKE EXPANDABLE MEMBER

[75] Inventor: Friedrich Koob, Munich, Fed. Rep. of Germany

[73] Assignee: Hilti Aktiengesellschaft, Schaan, Liechtenstein

[21] Appl. No.: 208,036

[22] Filed: Nov. 18, 1980

[30] Foreign Application Priority Data

Dec. 7, 1979 [DE] Fed. Rep. of Germany ....... 2949368

[51] Int. Cl.[3] .......................... G01F 13/00; F04B 9/08

[52] U.S. Cl. ...................................... 222/94; 222/103; 222/389; 222/136

[58] Field of Search ................... 222/136, 137, 94, 95, 222/386.5, 389, 103

[56] References Cited

U.S. PATENT DOCUMENTS 2,446,501 8/1948 Weber ................................ 222/389

3,234,737 2/1966 Hiland ................................ 222/94 X 3,237,814 3/1966 Collar ................................ 222/389 X 3,323,682 6/1967 Creighton, Jr. et al. ......... 222/95 X 3,390,814 7/1968 Creighton, Jr. et al. ........... 222/137

3,712,516 1/1973 Stamets et al. .............. 222/386.5 X 4,215,802 8/1980 Ornsteen ......................... 222/389 X

FOREIGN PATENT DOCUMENTS 2216598 10/1973 Fed. Rep. of Germany ...... 222/389

2019952 11/1979 United Kingdom ................ 222/136

*Primary Examiner*—David A. Scherbel

*Attorney, Agent, or Firm*—Toren, McGeady and Stanger

[57] ABSTRACT

In a device for the measured discharge of a single or multiple component viscous substance, a tubular container holds the substance. An expandable hose-like member is located within the container and is arranged to receive a propellant or expanding medium which forces the substance through an outlet.

7 Claims, 3 Drawing Figures

DISPENSER HAVING HOSE-LIKE EXPANDABLE MEMBER

SUMMARY OF THE INVENTION

The present invention is directed to a device for discharging measured amounts of a single or multiple component adhesive, sealing, filling or putty-like substance held within a tubular shaped container with an inlet opening into the container for admitting a propellant or expanding medium for pressing the substance through an outlet.

In particular in the building trade but also in other industries, at the present time there is increasing use of foaming or hardening substances or substances which remain plastic and are used for adhesive, sealing and filling purposes. A significant problem in the use of the devices which discharge such substances is that a relatively large force is required to press the very viscous substances through an outlet. Devices using a mechanically activated plunger usually have a considerable length because of the required plunger rod. The requirement for a high force input is related to the considerable friction between the plunger and the container walls, which friction is required for sealing purposes. Another disadvantage in known devices is the relative inability to properly dose the substance. The problem with discharging measured amounts of the substance involves the pressure increase and pressure decrease required in each discharge step. Known devices, operated by water pressure, also have the disadvantage of dependence on a water supply system.

Therefore, it is the primary object of the present invention to provide a simple device, not subject to frequent breakdowns, for discharging single or multiple component substances from a container.

In accordance with the present invention, the substance to be discharged is located within a container in which an expandable hose-like member is located and can be filled with a propellant or expanding medium for displacing the substance out of the container. By utilizing an expandable hose-like member, mechanical displacement systems are no longer required. Consequently, the play and mechanical wear which exists in such displacement systems are no longer a problem. Further, the device of the present invention affords a very compact construction. As the propellant or expanding medium, carbon dioxide or liquefied propellant gas contained in a cartridge can be used. Moreover, a compressed air system can be used as a source of the expanding medium within the device. In addition, the compressed air may be stored within the device itself.

In operation, to assure that the hose-like member expands first in a rearward portion, it is helpful if the hose-like member has a decreasing elasticity in the ejection or discharge direction. With such an arrangement, it is possible to prevent the already expanded region of the hose-like member which is in contact with the wall of the container from being moved against a frictional resistance. The elasticity of the hose, decreasing in the ejection direction, can be accomplished by an increasing wall thickness of the hose-like member or by incorporating reinforcing inserts.

A particularly simple construction of the device involves arranging the hose-like member extending centrally along the axial direction of the container for its full length so that the member is expandable in the radial direction. When the hose-like member is centrally arranged and has a decreasing elastic characteristic in the ejection direction, it is possible to press the substance from the rear of the container toward the outlet at the front end to assure that part of the substance does not remain in the rear part of the container.

When the device is used for discharging a multiple component substance, the individual components must be dispensed in the same proportions throughout the entire working period. To accomplish this end, the hose is surrounded by the components in sector-shaped compartments. Using such sector-shaped compartments, it is possible to provide different mixing proportions of a substance from the same device. For the improved mixing of the components in a chamber before they are discharged from the device, if a two-compartment substance is being used, it is preferred if the components are not in half-sectors but are arranged in sectors which form a quarter or a sixth of the circumference of the interior of the container.

Where the substance being discharged is especially viscous, it is advantageous to position the hose-like member behind the substance in the axial direction of the container, that is, as viewed in the direction in which the substance is displaced out of the container. Due to this arrangement, the required flow of the substance in the device is kept at a minimum. Accordingly, the force for displacing the substance is reduced.

In the arrangement with the hose-like member located behind the substance to be discharged, a great elasticity of the hose is required. Since the elasticity of the hose-like member cannot be increased at random, it is practical to form the hole-like member as an axially compressible bellows. A bellows has a very large capacity for expansion in the axial direction. Furthermore, the bellows can be compressed axially to a very considerable extent and requires little in the way of space in its compressed condition. Since a bellows expands radially to some degree when it is under internal pressure, it can also serve as a seal.

There are two different possible constructions of the device. In one construction, the substance is continuously under pressure of the propellant. To achieve a discharge of the substance, an outlet closing the container must be opened. This construction corresponds to the arrangement used in spray cans, siphon bottles and so-called foam spray dispensers. Where the container is continously under pressure, however, there is always a certain danger of accidents if the container is not properly handled. Moreover, refilling the container usually requires a complete loss of pressure within the device. For these reasons, the second construction is more advantageous in which an inlet valve is actuated by a trigger or push button with the inlet valve located in the path of flow of the expanding medium into the hose-like member. In this arrangement, only that amount of the expanding medium needed to discharge a required amount of the substance is supplied into the hose-like member. The expanding medium can be supplied from a pressure cartridge or a compressed air system. It is possible, that the contents of a single cartridge is sufficient to discharge the contents of several containers.

The discharge of the substance should be as continuous as possible and should not take place in a discontinuous manner. Such a discharge is particularly important when the substance is being applied as a layer of adhesive or for filling gaps. To provide such a continuous discharge, it is preferred that a pressure regulator is located in the path of the expanding medium being supplied into the hose-like member. By using a pressure regulator, it is possible to utilize expanding medium cartridges operating under high pressure. Accordingly, significantly greater amounts of the expanding medium can be stored in the same volume. Furthermore, it is possible to store the expanding medium in liquefied form.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 2, 3:
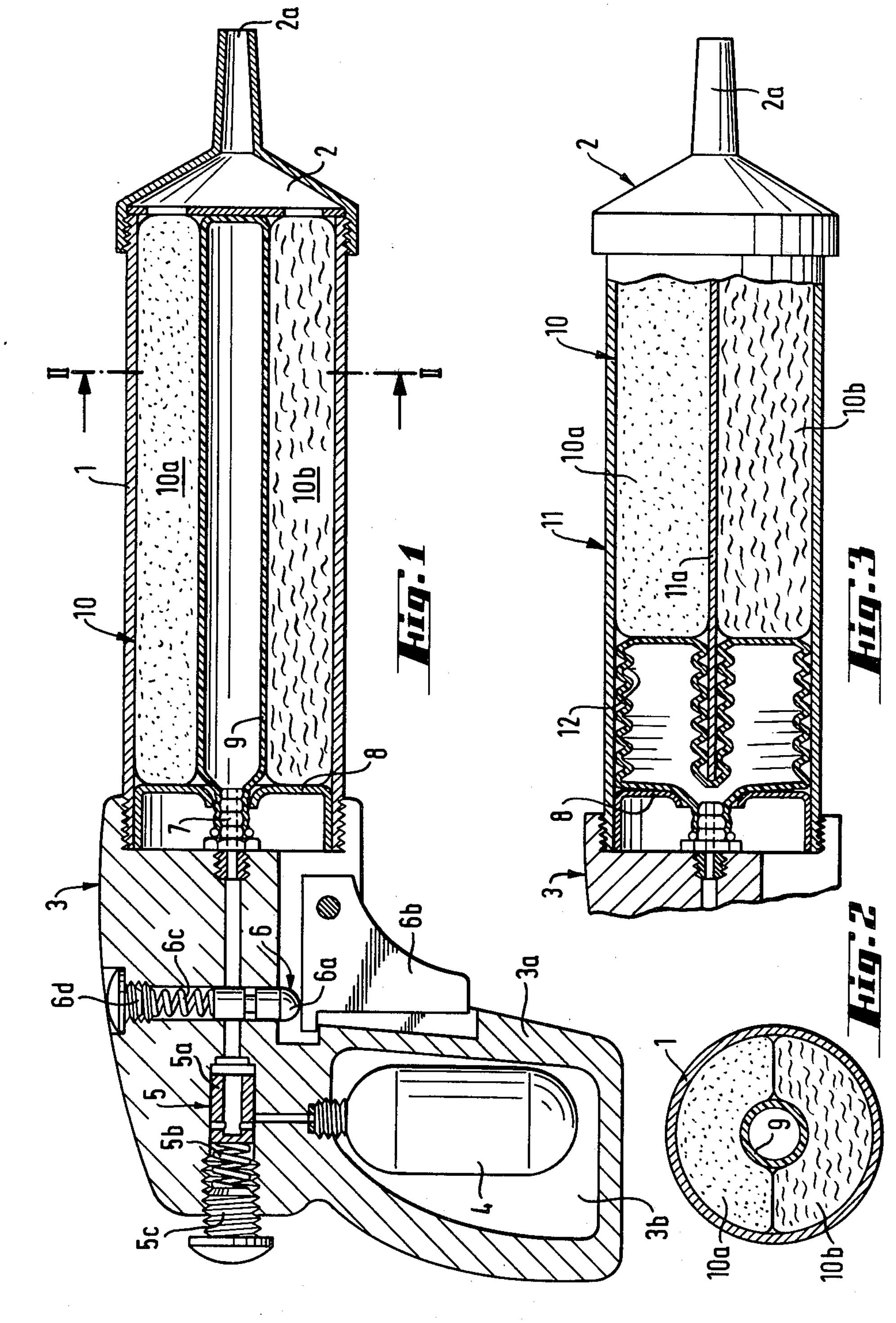
FIG. 1 is a sectional side view of a device embodying the present invention.
FIG. 2 is a transverse sectional view of the device illustrated in FIG. 1 tkaen along the line II—II.
FIG. 3 is a partial side view, in section, of another embodiment of the device incorporating the present invention.

The device illustrated in FIG. 1 includes an axially extending tubular container 1. The container 1 has a front end, the right end as viewed in FIG. 1 and a rear end, the left end as viewed in FIG. 1. At its front end, the container is connected to a mixing chamber 2 and at its rear end it is joined to a casing 3. The casing 3 forms a pistol-like handle 3a containing a receptacle 3b for a propellant or expanding medium cartridge 4. The cartridge 4 contains a pressurized medium such as carbon dioxide ($CO_2$). Positioned within the casing 3 is a pressure regulator 5. The pressure regulator 5 includes a slide 5a positioned above the outlet from the cartridge 4, a compression spring 5b biasing the slide 5a in the direction of the container 1, and a screw 5c for adjusting the operating pressure. During operation, slide 5a is moved by means of the compression spring 5b into the open position, as illustrated in FIG. 1 the slide is in the closed position. When the medium from the cartridge is admitted into the slide 5a the operating pressure is reached and the slide is again moved into the illustrated closed position. Adjoining the pressure relief valve is an inlet valve 6 located in the casing 3 between the rear end of the container 1 and the pressure regulator 5. Inlet valve 6 consists of a ram 6a, a pusher or trigger member 6b which displaces the ram within the casing 3, a spring 6c biasing the ram toward the trigger member and a stop 6d seated within the casing and supporting the opposite end of the spring from the ram . When the inlet valve is activated and displaced by the trigger member 6b, a portion of the contents of the expanding medium cartridge 4 flows into the rear end of the container 1. A nipple 7 is located at the outlet of the expanding medium passageway extending from the inlet valve 6 into the rear end of the container 1. The nipple 7 projects into the rear end of the container 1 and is laterally surrounded by a bottom portion 8 extending outwardly from the nipple to the inside surface of the container 1. One end of a hose-like member 9, formed of an elastic or expandable material, is pushed over the nipple 7 so that the flow through the nipple is directed into the hose-like member. The hose-like member 9 is cylindrically shaped and extends from the nipple 7 to the front end of the container 1 with the front end of the hose-like member being closed. Within the container 1, the hose-like member 9 is completely surrounded by a two-compartment substance 10 made up of the components 10a, 10b. When the inlet valve 6 is placed in the open position, the expanding medium flows through the nipple 7 into the hose 9 and radially expands the hose-like member. Due to the expanding action, an appropriate amount of the substance 10 composed of the components 10a, 10b flows from the front end of the container into the mixing chamber 2 and subsequently is discharged from the device through the nozzle 2a.

In FIG. 2, displaying a transverse section through the device in FIG. 1, the central arrangement of the hose-like member 9 within the substance 10 in the container is evident. The components 10a and 10b each take up a sector forming half of the cross-sectional area of the container located between the outer surface of the hose-like member 9 and the inner surface of the container.

In FIG. 3 another embodiment of the invention is illustrated with container 11 being separated over its entire length by a transversely extending separating wall 11a forming a pair of equal sectors each containing a different component 10a, 10b of the substance 10 being discharged from the device. A hose-like member 12 is located in the rear end portion of the container 11 rearwardly of the substance 10 made up of the two components 10a, 10b. The hose-like member 12 is in the form of a compressible bellows. When the hose-like member 12 receives the expanding medium, it presses against the rearward end of the substance 10 and the separate components of the substance are forced into the mixing chamber 2 and then out through the nozzle 2a. When the expanding medium enters the hose-like member 12 the internal pressure within the hose-like member acts in the radial direction and serves to press the bellows against the inner surface of the container 11 forming a seal.

While specific embodiments of the invention have been shown and described in detail to illustrate the application of the inventive principles, it will be understood that the invention may be embodied otherwise without departing from such principles.

What is claimed is:

1. Device for the measured discharge of a single or a multiple component adhesive, sealing, filling, or putty-like substance comprising an axially extending tubular container for holding the substance, said container having a first end from which the substance is discharged and a second end, said container having an inlet opening in the second end thereof for admitting an expanding medium to the container for displacing the substance out of the container, an expandable hose-like member located within said container and arranged to be in pressure transfer contact with the substance located within said container, said hose-like member extending from the second end toward the first end of the container, and means for introducing an expanding medium into said hose-like member so that said hose-like member expands and exerts a pressing action the substance within the container for displacing the substance from the first end of the container, and said hose-like member having a decreasing elasticity in the direction from the second end toward the first end of said container.

2. Device, as set forth in claim 1, wherein said device comprises a casing secured to the second end of said container, an inlet valve located with said casing for controlling the flow of the expanding medium into said hose-like member and means located in said casing for operating said valve so that the expanding medium can be admitted into said hose-like member.

3. Device, as set forth in claim 2, wherein a pressure regulator being located within said casing, means in said casing for supplying the expanding medium into said hose-like member, said pressure regulator being located between said means for supplying the expanding medium and said inlet valve.

4. Device for the measured discharge of a single or a multiple component adhesive, sealing, filling, or putty-like substance comprising an axially extending tubular container for holding the substance, said container having a first end from which the substance is discharged and a second end, a bottom portion extending transversely of said tubular container within the second end thereof and disposed in contact with the inside surface of said container, a nipple extending into the second end of said container and through said bottom portion and forming an inlet opening in the second end thereof for admitting an expanding medium into the container for displacing the substance out of the container, an expandable hose-like member located within said container and arranged to be in pressure transfer contact with the substance located within said container, said hose-like member secured at the second end to said nipple and extending from the second end toward the first end of the container, said nipple arranged to introduce an expanding medium into said hose-like member and the remainder of said hose-like member being closed so that said hose-like member expands and exerts a pressing action on the substance within the container for displacing the substance from the first end of the container, said hose-like member is centrally arranged within said container and extends along the axial length of said container from the first end thereof to the second end, and said hose-like member being expandable mainly in the radial direction within said container.

5. Device, as set forth in claim 4, wherein the interior of said container between said hose-like member and the inner surface of said container being divided into sector-shaped spaces each arranged to contain a separate component of the substance.

6. Device, as set forth in claims 4 or 5, wherein said device comprises a casing secured to the second end of said container, an inlet valve located within said casing for controlling the flow of the expanding medium into said hose-like member and means located in said casing for operating said valve so that the expanding medium can be admitted into said hose-like member.

7. Device, as set forth in claim 6, wherein a pressure regulator being located within said casing, means in said casing for supplying the expanding medium into said hose-like member, said pressure regulator being located between said means for supplying the expanding medium and said inlet valve.

* * * * *